United States Patent [19]

Wang et al.

[11] Patent Number: 5,167,936

[45] Date of Patent: Dec. 1, 1992

[54] PORTABLE DEVICE FOR TREATING EFFLUENT GAS FROM A LEAD BATTERY

[76] Inventors: Lianxiang Wang; Anchen Zheng; Shuo Zheng; Hang Zheng, all of Room 101, 12 Naner Lane, Changjiang Road, Lushuen Kuo District Dalian, China

[21] Appl. No.: 676,116

[22] Filed: Mar. 10, 1991

[30] Foreign Application Priority Data

Mar. 28, 1990 [CN] China ................................ 90203571

[51] Int. Cl.$^5$ ............................................. B01D 53/02
[52] U.S. Cl. ..................................... 422/177; 261/94; 261/96; 422/168; 422/255
[58] Field of Search ...................... 422/255, 168, 177; 261/94, 96; 55/249, DIG. 13

[56] References Cited

U.S. PATENT DOCUMENTS

| | | | |
|---|---|---|---|
| 3,606,982 | 9/1971 | Anderson | 261/96 |
| 3,653,643 | 4/1972 | Tucker | 261/96 |
| 3,695,593 | 10/1972 | Postlethwaite | 261/96 |
| 3,892,547 | 7/1975 | Tucker | 261/96 |
| 4,680,040 | 7/1987 | Gooray et al. | 55/DIG. 13 |

Primary Examiner—Robert J. Warden
Assistant Examiner—Timothy M. McMahon
Attorney, Agent, or Firm—Fisher, Christen & Sabol

[57] ABSTRACT

This is a portable effluent gas treating device used on non-active elements of the lead battery. It is composed of an acid-base resistant container and a cover with holes. A sponge-like filler containing alkali liquid is placed inside the container which opening top is connected with the cover and its lower part is provided with a passage communicating with the unit battery box. The present invention not only can eliminate the environment pollution of lead battery effluent gas, but also is convenient to use and to carry.

3 Claims, 2 Drawing Sheets

PORTABLE DEVICE FOR TREATING EFFLUENT GAS FROM A LEAD BATTERY

BACKGROUND OF THE INVENTION

The present invention is related to a portable device for treating effluent gas released from a lead battery, particularly to a new type of vent system used in a lead battery.

Lead batteries are one type of energy supply device. When a lead battery is charged, a large amount of acid gases will discharge from the battery to air via vents on the lid of the battery. The vents are simply made of opening holes with no other elements provided. These acid gases released without any treatment cause not only pollution against the environment, but also harm to human health.

One object of the present invention is to provide a portable device for treating effluent gases released from a lead battery.

Another object of the present invention is to provide a new type of vent system used in a lead battery for substantially removing effluent gases released from the lead battery.

The further or other objects of the present invention may be seen from the following detailed description of the present invention.

SUMMARY OF THE INVENTION

According to the present invention, a portable device for treating effluent gas released from a lead battery comprises a container having within it a sponge-like filler containing alkali liquid and a cover with at least one hole adapted to the container. The lower part of the container has at least one hole to receive the effluent gas released from the lead battery.

A vent system of a lead battery for releasing effluent gas from the lead battery comprises a container having within it a sponge-like filler containing alkali liquid and a cover with at least one hole adapted to the container. The lower part of the container has at least one hole to receive the effluent gas from the lead battery.

DETAILED DESCRIPTION OF THE INVENTION

According to the present invention, a portable device for treating effluent gas released from a lead battery comprises a container, a sponge-like filler within the container to absorb alkali liquid, and a cover with at least one hole to discharge gas from the container. At least one hole is provided at the lower part of the container to receive effluent gas discharged from the lead battery so that the effluent gas can be treated before being released into the air. A pipe may be added with one end connected with the hole at the lower part of the container and the other end connected with the lead battery to provide a passage between the container and the lead battery.

Accordingly, the container is composed of bottom and side walls, and its form can be defined by application. The hole in the container may be either in the side wall or at the bottom of the container. When the hole is located at the bottom, the pipe connected to the hole is preferably arranged in such a way that the top end of the pipe is inside the container to contain a small amount of the liquid which may occur, then to prevent the liquid from coming into the lead battery. When the hole is in the side wall, a distance is preferably provided between the hole and the bottom of the container.

The sponge-like filler is made of material such as polyurethane soft foam plastics, etc., which is placed inside the container. The filler shape matches the internal body of the container and preferably fills the body, which holes and gaps contain alkali liquid, such as caustic soda solution, etc. Said alkali liquid can react and neutralize the acid gases discharged from the battery. At the top opening of the container the cover, the form of which matches the shape of the side walls, is provided and can be connected with the container. The connection between the cover and the container can be a screw or transition fit. The hole provided on the cover permits the treated effluent gases coming from the container to be discharged to the air. The cover not only prevents impurity and waste from coming to its interior, but also can reduce vaporization of water in alkali liquid. The container and the cover are made of acid-base resistant materials, such as plastics, glass, etc.

According to the present invention, the device is also used as a vent system of a lead battery.

PREFERRED EMBODIMENTS

The present invention will be described in detail in connection with the sample shown in the accompanying drawings.

Figure 1:
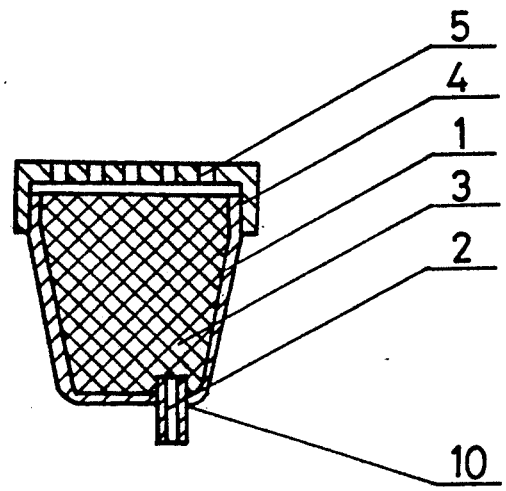
FIG. 1 is a sectional view of the present invention applied on the cover of an existing ordinary lead battery.

As shown in FIG. 1, a portable effluent gas treating device of a lead battery is applied on the cover of an existing ordinary lead battery. The container body 1 is a truncated cone to easily screw off of the cover located below. In the bottom, hole 10 is provided with a short pipe 2. One end of the pipe is within the internal body of the container and the other end of the pipe is inserted into the hole on the cover of the lead battery. The polyurethane soft foam plastics 3, with a truncated cone shape similar to the body form, is placed in the container. Said foam plastics contains a caustic soda solution. Cover 4 is provided on the body top and it connects the body in transition fit. There are some pass holes 5 in the cover.

Figure 2:
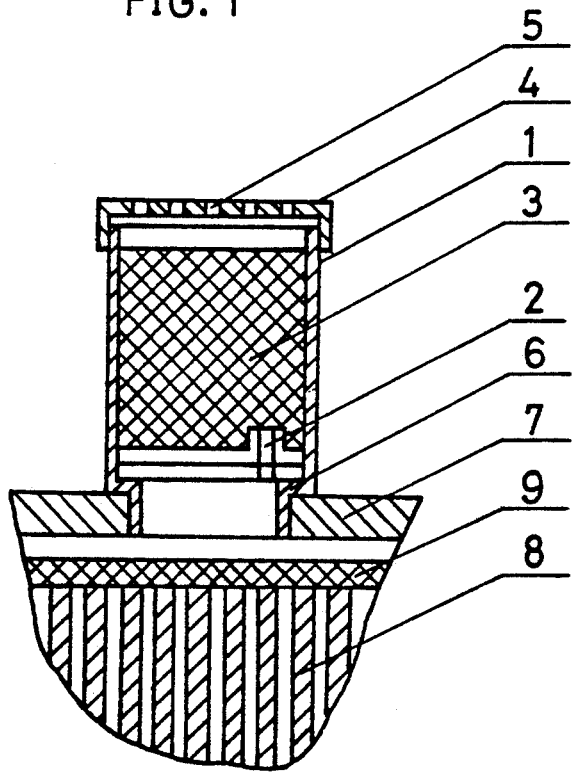
FIG. 2 is a sectional view of the present invention installing an additional cover on the existing ordinary lead battery.

As shown in FIG. 2, a portable effluent gas treating device of a lead battery is designed for the existing ordinary lead battery with an additional hole cover installed on the battery. This additional cover has a pass hole to pass effluent gas from the lead battery. The container body is of a cylinder. The polyurethane soft foam plastics 3, with cylinder shape similar to the body form, is placed in the container and contains caustic soda solution. The screw on the top of the body is connected with the cover which has some holes 5 on it. The hole 10 at the body bottom is provided with a short pipe 2 projecting towards the interior of the container. The short pipe is ended at bottom level without protruding out of the container. The container is connected to the additional cover of the lead battery cover. The screw on the side walls of said additional cover is coupled with the screw on the opening hole of lead battery 7. The buffer layer made of polyurethane soft foam plastics bulk 9 is provided above the pole plate 8 of said lead battery, which not only prevents sulfuric acid from splashing out, but also blocks partial acid fog from rising.

Figure 3:
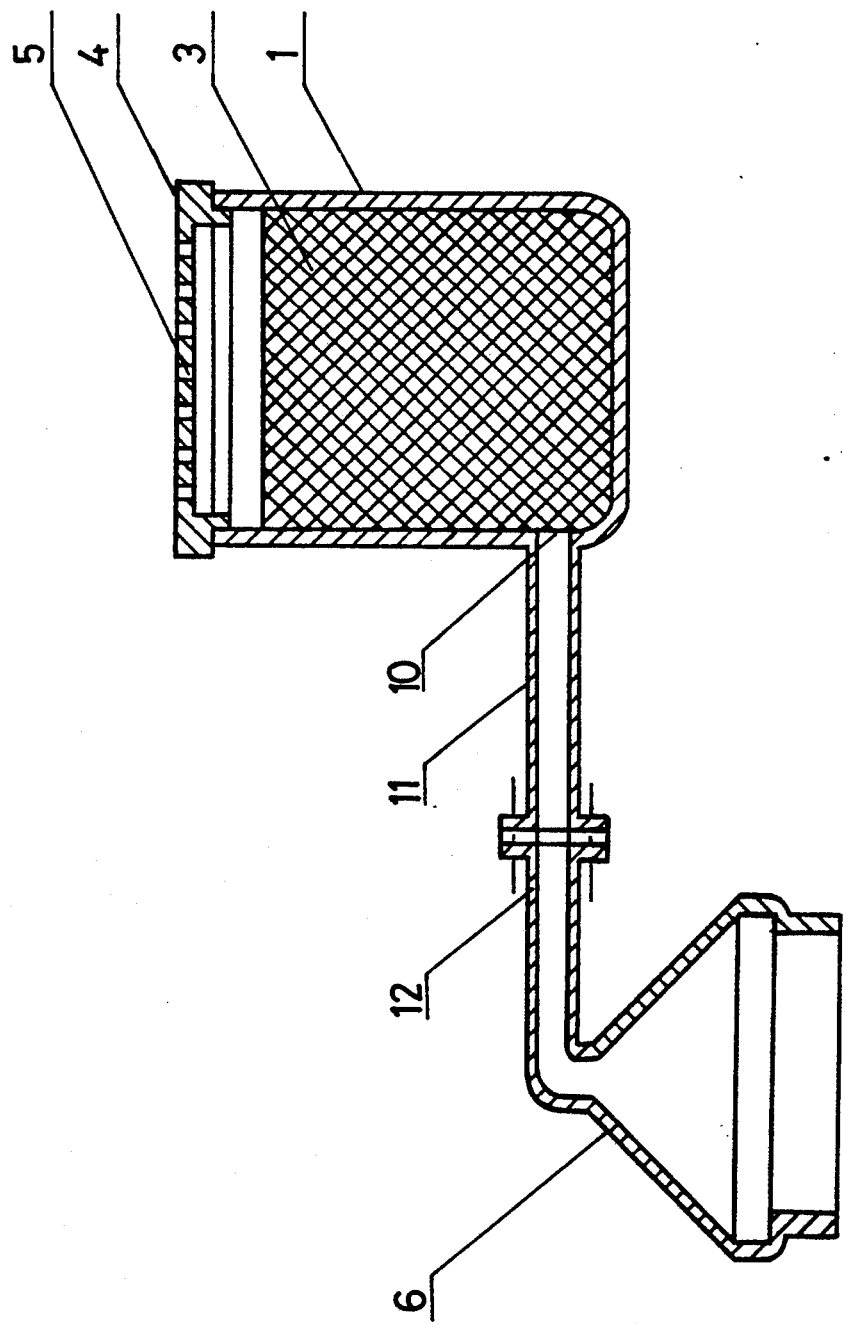
FIG. 3 is a sectional view of the present invention installing an additional cover on the existing ship battery.

As shown in FIG. 3, a portable effluent gas treating device of a lead battery is designed for the existing battery used on ships, with an additional hole cover installed on the battery. This additional cover has a pass hole to pass effluent gas from the lead battery. The container body 1 is of a cylinder shape. The polyurethane soft foam plastics 3, with cylinder shape similar to the body form, is placed in the container. The plastics contains caustic soda solution. The cover 4, with some small holes, is connected with the container in transition fit. The hole 10 on the lower part of the side wall of the body is communicating with conduit 11. Said conduit, through coupling elements such as flanges, is communicating with another conduit 12 which is connected with the pass hole of the additional hole cover. The top of the cover 6 is cone-shaped and is convenient for collecting a large amount of acid fog discharged from the battery box during the charging process. The additional hole cover is connected with the mouth of said battery in transition fit.

As compared to the state of the art, the present invention has the following advantages:

1. The effluent gases discharged from the lead battery, after passing through said device, do not contain acid components, thereby eliminating environmental pollution.

2. It is convenient to carry and to use.

3. Its tenure is long.

What is claimed is:

1. A lead battery comprising:
   a lead battery body,
   a vent system of the lead battery body which comprises: a container having with it an absorbent cellular filler containing alkali liquid,
   a cover with at least one hole connected to the container, and
   a container having at least one hole at is lower part; the vent system being attached to the lead battery body whereby the effluent gas from the lead battery body passes through the vent system via the hole at its lower part before being released to the atmosphere.

2. A lead battery as claimed in claim 1, further comprising a pipe, said pipe having one end connected with the hole at the lower part of the container, and the other end of said pipe being connected to the lead battery body.

3. A lead battery as claimed in claim 2, wherein the hole at the lower part of the container is located at the bottom of the container and the pipe is connected with the hole in such a way that one end of the pipe protrudes upwardly into the container to avoid the alkali liquid flowing into the lead battery body through the pipe.

* * * * *